United States Patent [19]
Uchida et al.

[11] 3,913,429
[45] Oct. 21, 1975

[54] NUMERICALLY-CONTROLLED LATHE WITH PROGRAM-CONTROLLED TOOL HEAD

[75] Inventors: Yoshiro Uchida; Yutaka Matsumura; Tadashi Nonaka; Kinya Hirota; Jiro Takashita; Hisashi Ishida, all of Abiko, Japan

[73] Assignee: Hitachi Seiki Co., Ltd., Tokyo, Japan

[22] Filed: Jan. 24, 1974

[21] Appl. No.: 436,374

[30] Foreign Application Priority Data

| Feb. 10, 1973 | Japan | 48-16101 |
|---|---|---|
| Feb. 10, 1973 | Japan | 48-16102 |
| Feb. 10, 1973 | Japan | 48-16103 |
| Feb. 10, 1973 | Japan | 48-16104 |

[52] U.S. Cl. .................... 82/2 B; 29/568
[51] Int. Cl.² ............ B23B 3/00; B23Q 39/00
[58] Field of Search ............ 82/2, 2 A, 2 B; 29/568

[56] References Cited
UNITED STATES PATENTS

| 2,384,809 | 9/1945 | Bullard et al. | 82/2 B |
| 2,838,963 | 6/1958 | Good et al. | 82/2 B X |
| 2,859,290 | 11/1958 | Grinage | 82/2 B X |
| 3,324,364 | 6/1967 | Caruthers | 82/2 B |
| 3,343,243 | 9/1967 | Renker | 82/2 B X |
| 3,481,230 | 12/1969 | Horobin | 82/2 |

Primary Examiner—Harrison L. Hinson
Attorney, Agent, or Firm—Wenderoth, Lind & Ponack

[57] ABSTRACT

A numerically-controlled lathe with program-controlled tool heads comprising a slide which is controlled by a numerical control unit according to tape commands in movement in parallel with and at a right angle to an axis of a spindle of a headstock, a single or plural number of No. 1 tool heads which are mounted on said slide and provided with a plural number of cutting tools to be used to cut an outside diameter and inside diameter of a workpiece being mounted on said spindle, a movable head which is located away from said slide in reference to the headstock and is controlled by a presetting means of a presetting type program control different from said numerical control unit with respect to a movement in parallel with the axis of the spindle and No. 2 tool head which is mounted on said movable head and is provided with a cutting tool to be used to cut the inside or outside diameter of said workpiece, wherein a signal generated from said numerical control unit which controls the No. 1 tool head is received by the presetting type program control unit which controls the No. 2 tool head and a signal generated from the presetting means of the presetting type program control unit is received by said numerical control unit to make the presetting type program control unit different from said numerical control unit and the numerical control unit according to tape commands mutually restrict and control, in the numerically-controlled lathe with program-controlled tool heads including said Nos. 1 and 2 tool heads capable of simultaneous cutting.

7 Claims, 8 Drawing Figures

NUMERICALLY-CONTROLLED LATHE WITH PROGRAM-CONTROLLED TOOL HEAD

The present invention relates to improvement of a numerically controlled lathe with a numerically-controlled tool head and a program-controlled tool head.

Conventionally known numerically-controlled lathes are designed so that movement of the tool head is controlled according to only the information of the command tape which is prepared in advance. Accordingly, the tool head to be controlled is not such that the tool head performs simultaneous cutting with a plural number of cutting tools or a plural number of tool heads are also controlled individually except for extremely complicated expensive 4-axis controlled cutting. Even though a machine tool is provided with a plural number of cutting tools, a single cutting tool alone is assigned to cutting in any case and therefore the conventional lathe is beyond a turret lathe capable of multi-cutting, from the viewpoint of the cutting efficiency. Recently, with attention directed to said problems of the numerically-controlled, high technical consideration has tended to be given to control simultaneously two tool heads in different ways of movement. As an attempt to achieve this result, a system is known which controls movement of two tool heads simultaneously while checking interference between the cutting tools according to a program prepared using a proper command tape and numerical control unit for each command tape.

As another attempt to achieve the same result, a system is known in which the priority of movements of the tool heads is preset, information corresponding to movements of the tool heads according to this priority is recorded in a single command tape as an information block, an identification code of said tool head to be selected is prefixed to the head of said information block and the information of the command tape read by the tape reader is transmitted to a necessary data processing unit of the data processing units for two tool heads, whereby two tool heads are controlled.

In the conventional methods as described above, however, the cutting tools to be mounted on the tool heads are divided into respective applications for inside diameter and outside diameter; each tool head has proper coordinates and the cutting time differs with the tool head and the stroke passages of cutting tools drawn when two tool heads are moved separately at the same time, and it is difficult to perform the programming according to visual confirmation of said stroke passages of cutting tools. Accordingly, it is difficult to perform programming while considering interference between the cutting tools.

The first purpose of the present invention is to provide a numerically-controlled lathe with programcontrolled tool heads permitting simultaneous cutting by means of Nos. 1 and 2 tool heads, while preventing interference between the two tool heads, by providing said No. 2 tool head the movement of which in parallel with the axis of the spindle is controlled by the presetting type program control unit having an independent machining program setting means without using a numerical control unit on the numerically-controlled lathe having the No. 1 tool head provided with the No. 1 tool head which is numerically-controlled according to tape commands in the movement in parallel with and at right angle to the axis of the spindle and is provided with outside and inside diameter cutting tools and by interchanging the control information between the command tape of said numerical control unit and the presetting means the setting of which is changeable at a proper timing of the presetting type program control unit.

The second purpose of the present invention is to provide a numerically-controlled lathe with program-controlled tool heads permitting simultaneous cutting by means of Nos. 1 and 2 tool heads while preventing interference between these two tool heads according to a program using a numerical control tape format for general 2-axis control, which is adapted so that, in the numerically-controlled lathe with program-controlled tool heads in accordance with the first purpose, a start command for the No. 2 tool head is transmitted from the command tape to said presetting type program control unit, a read interrupt command which interrupts reading of the next information block to be recorded from the command tape into the corresponding command tape is transmitted to the numerical control unit to prevent interference due to relative operation of the Nos. 1 and 2 tool heads, the start command of the No. 2 tool head is designated with a proper timing, while confirming movement of the cutting point of the No. 1 tool head by cancelling said read interrupt command according to a read interrupt release command from the presetting switch the setting of which is changeable, provided on said presetting type program control unit and the start command for the No. 1 tool head can be designated while confirming interference of the cutting tools occurring in the relative movement of the No. 1 and No. 2 tool heads.

The third purpose of the present invention is to provide a numerically-controlled lathe with program-controlled tool heads which is adapted so that, in the numerically-controlled lathe with program-controlled tool heads in accordance with the first purpose of the present invention, a spindle speed setting switch is provided on the presetting panel which is provided on said presetting type program control unit and is changeable in setting with a proper timing, an optimum spindle speed can be set by said spindle speed setting switch in accordance with the cutting cycle of the No. 2 tool head and a cutting speed for multi-cutting can be set to the most favorable condition in conjunction with a spindle speed change command from both since the spindle speed can be set also according to the command tape.

Furthermore, the fourth purpose of the present invention is to provide a numerically-controlled lathe with program-controlled tool heads which is adapted so that, in the numerically-controlled lathe with program-controlled tool heads in accordance with the first purpose of the present invention, the presetting switch for the forward travel limit stop command of the No. 2 tool head is provided on the presetting panel on said presetting type program control unit for use when performing heavy cutting of a workpiece held and depressed by the center provided at the No. 2 tool head, cutting a cylindrical workpiece between centers or cutting of a bar workpiece in which a stand which supports a long bar and the No. 2 tool head which is stopped at the forward travel limit according to indication of said presetting switch is withdrawn according to the retreat command from the command tape.

The program control unit herein described is comprised of sequence control means and position control means. The sequence control means permits free selection of sequence operations and cutting conditions of the tool heads from predetermined patterns of operations with a setting means such as an on - off switch the setting of which is freely changeable (for example, pin board switch, snap switch, punched card, etc.). The position control means permits setting of movement of the tool heads with an adjustable dog and a numerical setting means using an on-off switch such as the pin board switch or a digital switch (for example, thumb wheel switch, cam switch, rotary switch, etc.)

The following describes in detail an embodiment of the present invention according to the accompanying drawings.

FIG. 3 is a perspective view illustrating the relative dimensions of the dog of command drum 14 and of ram retreat limit confirm limit switch 28a;

Figure 1:
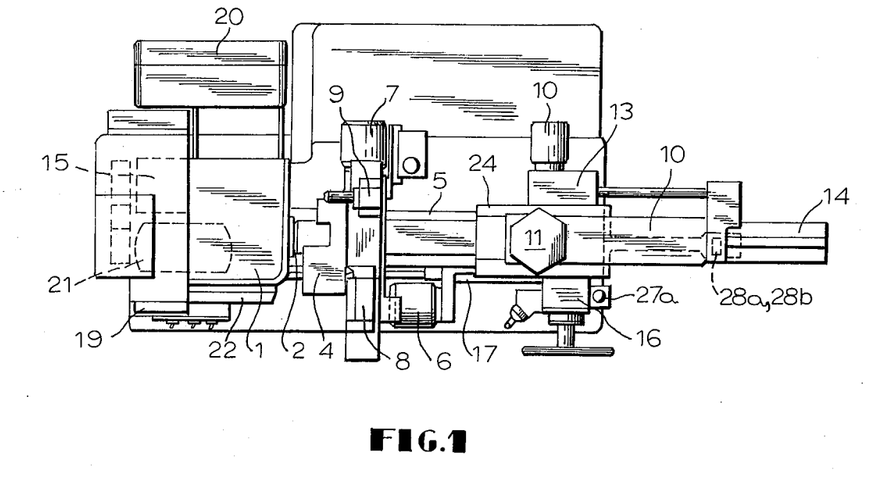
FIG. 1 is a plan view of the numerically-controlled lathe with presetting type program-controlled tool heads according to an embodiment of the present invention.
Figure 2:
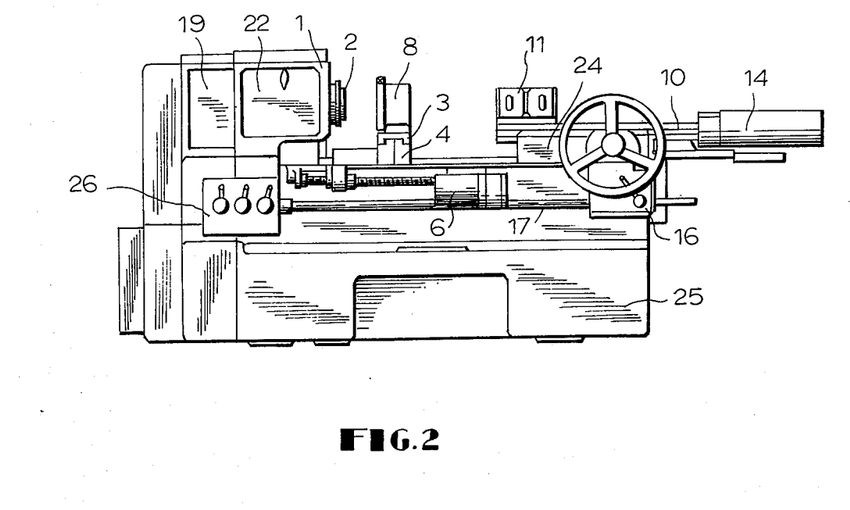
FIG. 2 is a side view of said lathe.
Figure 3:
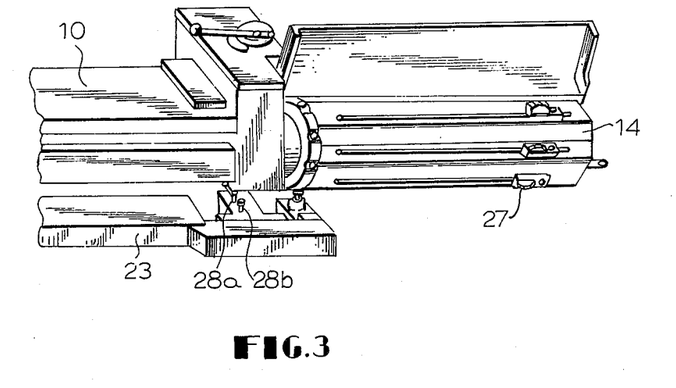
Figure 4:
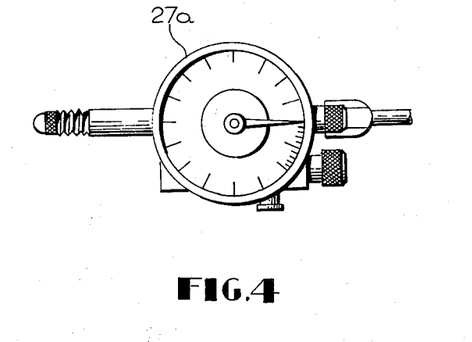
FIG. 4 is a plan view of the signal indicator.

As shown in FIGS. 1 and 2, spindle 2 borne by headstock 1 is revolved at a specified rate by motor 21 provided inside bed 25 through spindle speed changing driving unit 15. The carriage is mounted slidably parallel with the axis of the spindle on guideway 5 of bed 25 and cross slide 3 is provided slidably at a right angle to the axis of the spindle on said carriage 4. Cross slide 3 is provided with tool head 8 for the outside diameter and tool head 9 for the inside diameter so that the axis of the spindle is interpositioned and each tool head is adapted to be mounted with a single or plural number of cutting tools and can be turned indexed and selected as required. Carriage 4 is driven by Z feed pulse motor 6 and cross slide 3 by X feed pulse motor 7. In addition, in the drawings, slidable saddle 24 is provided at the extreme right part of guideway 5 and can be shifted slightly for adjustment as required. Ram 10 which holds turret tool head 11 rotatably on saddle 24 so that it can freely be slid in parallel with the axis of the spindle. Ram 10 is driven in rapid traverse by motor 12 through rapid traverse drive unit 13 and in cutting feed is driven by feed drive lever 17 through cutting feed drive unit 16. Turret tool head 11 is rotated by the intermittent rotation indexing drive unit built in rapid traverse drive unit 13 in the course of rapid withdrawal of ram 10. Command drum 14 which rotates in accordance with each face of turret tool head 11 is provided at the rear part of ram 10 and dog 27 for stopping rapid traverse of the ram which is adjustable in the moving direction of ram 10 is attached to said command drum 14 as shown in FIG. 3. Limit switch holding block 23 is fixed at the rear part of saddle 24 and said limit switch holding block 23 is provided with ram withdrawal confirm limit switch 28a, and rapid traverse stop limit switch 28b. Accordingly, when ram 10 reaches the withdrawal limit, the dog (not shown) attached to ram 10 actuates said ram withdrawal confirm limit switch 28a, thus confirming that ram 10 has withdrawn completely. When the start command is given to ram 10, ram 10 advances in rapid traverse and the operation is automatically switched over to the cutting feed when said dog 27 for stopping rapid traverse of the ram actuates said limit switch 28b. At the forward travel limit, the adjustable stop screw (not shown) provided on ram 10 acts on signal indicator 27a and the cutting end signal is generated to stop the cutting feed of the ram.

Figure 6:
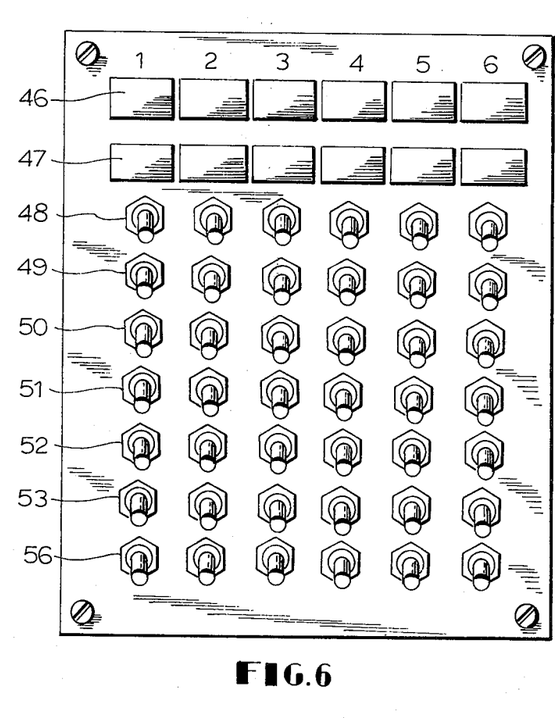
FIG. 6 shows an arrangement of setting switches on presetting panel 19.

Manually-operated control panel 22 and presetting panel 19 are provided in position for easy operation at the front side of said headstock 1 and program control panel 20 which designates the cutting cycle of turret tool head 11 and changing of the spindle speed is provided at the rear part of headstock 1. Presetting panel 19, as shown in FIG. 6, is provided with the cutting cycle setting switches for cutting tools mounted on the faces of turret tool head 11 in a horizontal row in the sequence of processes and the presetting switches for designating the cutting cycle conditions in a vertical row. From the upper row, spindle speed selector switch 46, cutting feed rate selector switch 47, turret start command switch 48, turret standby command switch 49, turret skip command switch 50, turret dwell command switch 51, turret feed single operation switch 52, tape standby release command switch 53 and cycle stop command switch 56 are arranged in sequence. Spindle speed selector switch 46 permits selection from five speeds, A, B, C, D and T.

Figure 5:
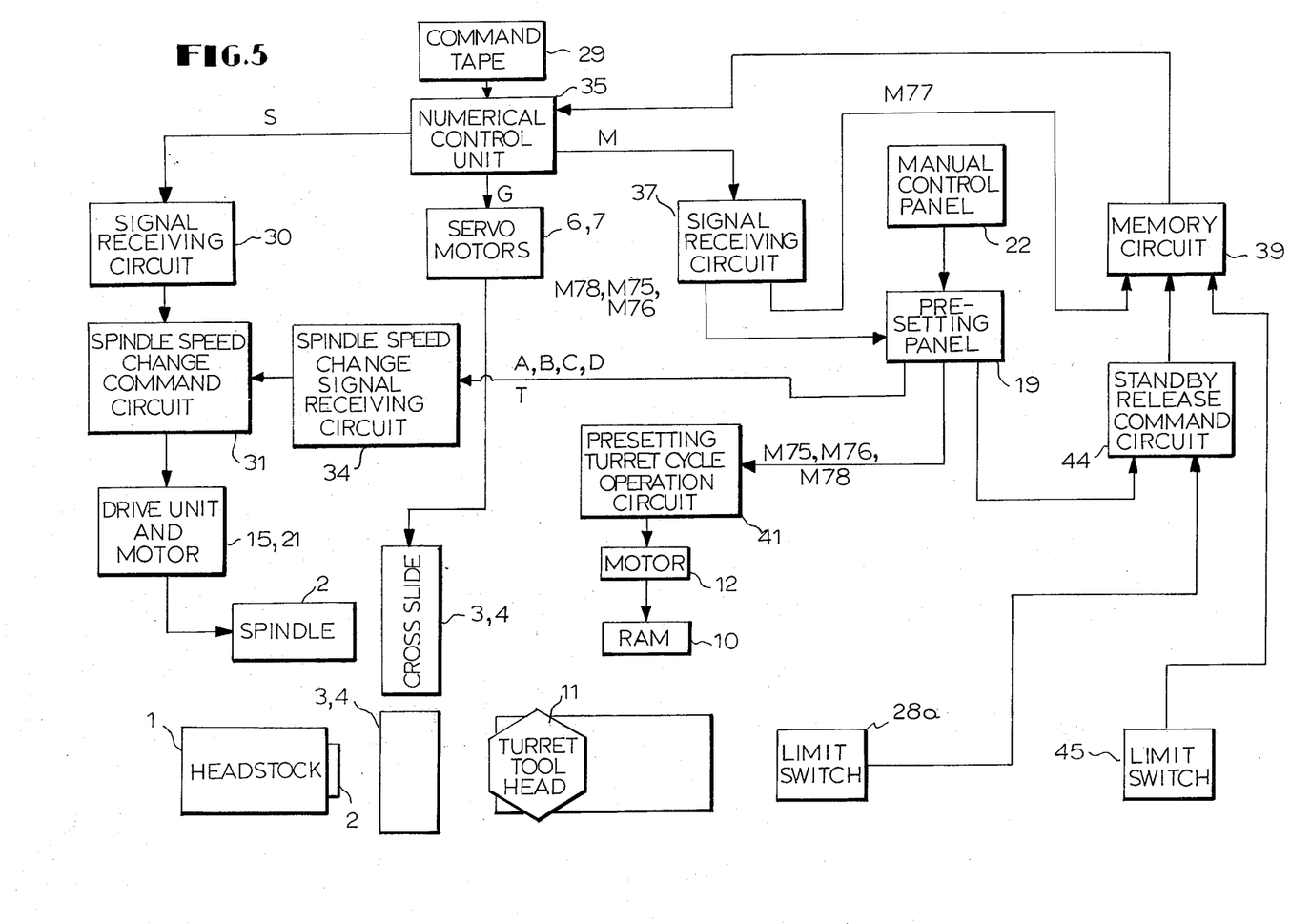
FIG. 5 is a control block diagram in an embodiment of the present invention.

The following describes in detail the action of an embodiment of the present invention constricted as described above. FIG. 5 shows the block diagram describing the control system of the present invention. Command tape 29 stores all necessary auxiliary command information for cutting including information to control movement of cross slide 3 and carriage 4. The auxiliary command information includes the spindle speed change command, tape standby command and operation start command of the presetting type program control circuit. It is herein assumed that the spindle speed change command is available in SA, SB, SC and SD codes, tape standby command in M77 code, and operation start command (hereinafter referred to as the procon cycle start command) of the presetting type program control circuit in M75 and M76 codes. When numerical control unit 35 reads an information block to move cross slide 3 and carriage 4 from the information blocks stored in command tape 29, numerical control unit 35 transmits the pulses of the predetermined frequency to servo motors 6 and 7. If said information block contains M75 and M76 codes of the procon cycle start command, numerical control unit 35 transmits said procon cycle start command to presetting panel 19 through M signal receiving circuit 37. Code M75 of the procon cycle start command is a signal to start turret tool head 11 from the first turret face and code M76 is a signal to start turret tool head 11 from any face following the first turret face. When presetting panel 19 receives the procon cycle start command, presetting turret cycle operation circuit 41 completes preparatory operation and actuates motor 12 provided for rapid traverse drive unit 13 (FIG. 1) and the change-over clutches provided for cutting feed drive unit 16 according to the setting cycle of presetting panel 19 shown in FIG. 6, thus commencing movement of ram 10. In other words, under this condition, simultaneous cutting is commenced by outside diameter tool head 8 and inside diameter tool head 9 on cross slide 3 and turret tool head 11.

The cycle setting at the presetting panel is such that, the spindle speed is set in accordance with the cutting speed by spindle speed selector switch 46 for each face of turret tool head 11 and the feed rate of the cutting tool per revolution of the spindle is set by cutting feed rate relector switch 47. When turret start command switch 48 is turned to ON, the presetting panel receives the cycle start command from command tape 29 to cause turret tool head 11 to start cutting and said turret tool head indexes the turret faces in sequence and continues the cutting. When said switch 48 is set to OFF, the turret tool head stops at the time of completion of cutting by a cutting tool mounted on said turret face and remains stopped unless otherwise a start signal from command tape 29 is received. Turret standby command switch 49 is operated to stop temporarily turret tool head 11 at the forward travel limit. This switch is mainly utilized when performing the centering of a cylindrical bar with said turret tool head 11 as the tailstock and the heavy cutting of a workpiece held by the center which is mounted on the turret tool head. In this case, the turret tool head is withdrawn according to a command of command tape 29. Turret skip command switch 50 is operated to perform skip indexing of turret tool head 11, and skip indexing is continued until the turret face of turret tool head 11 on which a cutting tool is mounted is reached while skipping the turret faces of the turret tool head. In this case, said turret start command switch 48 is kept at the ON position. Turret dwell command switch 51 is operated to cause the cutting tool to dwell at the cutting end position for a certain period of time (approximately 0.1 – 10 seconds) to improve the accuracy of the cutting length by turret tool head 11. Turret single operation switch 52 is used to stop temporarily the automatic cycle of turret tool head 11 and to permit the turret tool head to be operated manually. When the cutting tool mount face for which said switch is set to the ON position is reached, turret tool head 11 does not start and the operator can control manually the movement of turret tool head 11. Tape standby release command switch 53 is used to generate the read start command when reading of command tape 29 is idle temporarily, as described above.

When cycle stop command switch 56 is set to the ON position, said presetting type turret cycle operation circuit 41 is automatically returned to the cutting cycle of the first turret face of turret tool head 11 at the same time the cutting cycle of turret tool head 11 set by presetting panel 19 is completed. If the cutting tools of outside diameter tool heads 8 and inside diameter 9 interfere with the cutting tool of turret tool head 11 when simultaneous cutting by outside diameter and inside diameter turret tool heads 8 and 9 and turret tool head 11 is proceeding, code M77 for designating command tape 29 to be standby is recorded.

Numerical control unit 35 transmits said tape standby signal to M77 memory circuit 39 through the M signal receiving circuit 37 and feeds back it to numerical control unit 35 to stop temporarily the reading of command tape 29. Accordingly, movement of outside diameter tool head 8 and inside diameter tool head 9 is interrupted temporarily until the cutting by the cutting tool mounted at the corresponding turret face of turret tool head 11 is finished.

If tape standby release switch 53 ON is included in the cutting cycle setting condition by the cutting tool at said turret face when said cutting is finished, turret tool head 11 is withdrawn and the cutting tool of the next turret face is selected, the confirm command of withdrawal limit switch 28a and the tape standby release setting command of said presetting panel 19 are transmitted to tape standby release command circuit 44 and the tape standby command held by M77 memory circuit 39 is released. Accordingly, the reading of command tape 29 by numerical control unit 35 is commenced and movement of outside diameter tool head 8 and inside diameter tool head 9 is resumed. In this case, simultaneous cutting is commenced as described above when start command switch 48 on presetting panel 19 is set to ON, and the cutting only by outside diameter and inside diameter tool heads 8 and 9 is commenced when said switch 48 is set to OFF. If codes SA - SD of the spindle speed change command are stored in command tape 29, the information read by numerical control unit 35 is transmitted to spindle speed change command circuit 31 through S signal receiving circuit 30 after having been converted into the command signal of the corresponding spindle speed. A necessary relay for spindle speed change command circuit 31 is selected, the change-over clutch of spindle speed change drive unit 15 (FIG. 1) and motor 21 operate and spindle 1 starts. The spindle speed change command is also generated from spindle speed selector switch 46. Spindle speed selector switch 46 of presetting panel 19 enables selection of five types of commands, A, B, C, D and T as described above, the selector switches for A, B, C and D relate to the spindle speed change command and that for T is to prevent presetting panel 19 from generating the spindle speed change command. The command from presetting panel 19 is transmitted to spindle speed change command circuit 31 through preset spindle speed change signal receiving circuit 34 and the speed of spindle 1 is changed by the change-over clutch for spindle speed change drive unit 15 (FIG. 1) and motor 21 which are actuated by necessary relay circuits. When command T alone is generated from presetting panel 19, the spindle speed is selected according to the indications from command tape 29.

Accordingly, the spindle speed can be designated both by command tape 29 and presetting panel 19. The spindle speed is changed by the newest command information, that is, the finally generated command signal. If the spindle speed signal set on the presetting panel is transmitted to said spindle speed change command circuit 31 even though the cutting by outside diameter and inside diameter tool heads 8 and 9 is commenced at the spindle speed designated by command tape 29, the spindle speed is changed at that timing. In the case that said procedure is reversed, the spindle speed is changed by the tape command.

Figure 7:
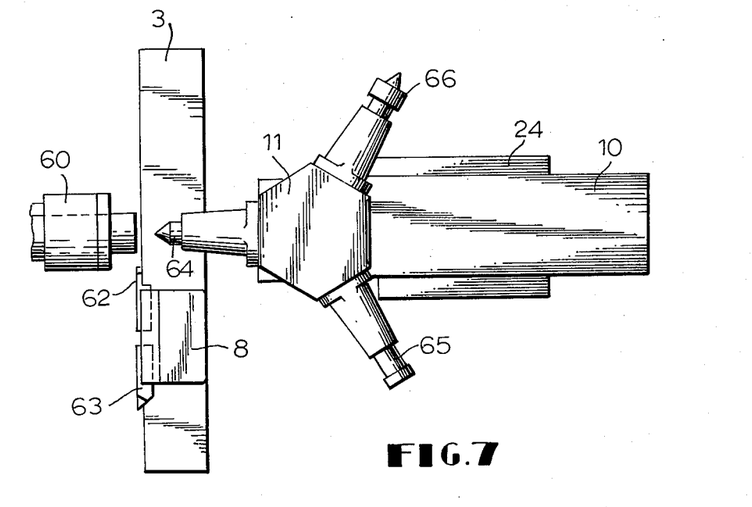
FIGS. 7 and 8 show an arrangements of the cutting tools in the cutting of a bar workpiece by the numerically-controlled lathe with presetting type program control tool heads according to an embodiment of the present invention.
Figure 8:
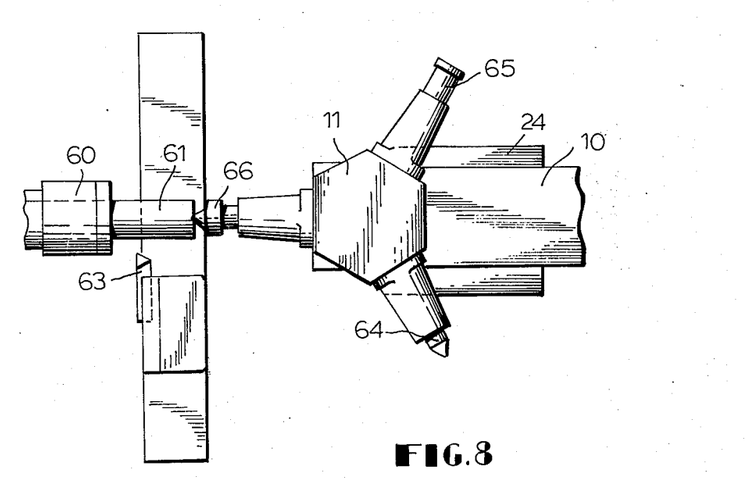

The turret standby command switch of presetting panel 19 is operated to perform heavy cutting while a workpiece is kept depressed by the center mounted on the turret tool head, centering of a cylindrical workpiece or cutting of a bar workpiece requiring a bar stand when the bar projects greatly. FIG. 7 shows an embodiment for bar workpiece cutting. When the start switch provided on manual operation panel 22 (FIGS. 1, 2 and 5) is depressed, spindle 2 is started at a speed designated by command tape 29 or spindle speed setting switch 46 of presetting panel 19, and cycle start command M75 is transmitted from command tape 29 to presetting panel through numerical control unit 35. For the first station of presetting panel 19, the required feed rate and turret start command switch 48 are set and center drill 64 attached to the first turret face of turret tool head 11 advances to perform center cutting of blank material 61. Numerical control unit 35 reads tape standby command M77 from command tape 29 and stops reading of the command tape temporarily. When machining by center drill 64 is completed, turret tool head 11 retreats in rapid traverse and the turret face to which bar stop 65 is attached is selected while skipping the turret face indexing of the second station when collet chuck 60 releases blank workpiece 61 and the bar feed unit (not shown) provided at the rear part of headstock 1 feeds blank workpiece 61 as long as required, turret tool head 11 begins to advance at the same time. The cycle of the third station of turret tool head 11 is set at the third station of presetting panel 19 (FIG. 6) and cutting feed rate selector switch 47 and turret start command 48 are set. Bar stop 65 advances as long as required and the delivery of blank workpiece 61 is determined. After this, blank workpiece 61 is chucked by collet chuck 60 and at the same time turret tool head 11 retreats. Turret face indexing of the fourth station is skipped and the turret face of turret tool head 11 on which rotary center 66 of the fifth station is provided is selected. Turret standby command switch 49 and turret start command switch 48 are set for the fifth row of presetting panel 19 and said turret tool head 11 advances as much as required to engage rotary center 66 with the center hold of blank workpiece 61 and to clamp ram 10 to saddle 24. At the same time the clamping is completed, the tape standby command held by M77 memory circuit 39 is released by the tape standby release command of clamp confirm limit switch 45 and reading of command tape 29 is commenced. Accordingly, outside diameter cutting by outside diameter cutting tool 63 of outside diameter tool head 8 is performed. When outside diameter cutting is completed code M78 of the ram rapid withdrawal command recorded in command tape 29 is read by numerical control unit 35 and is transmitted to presetting panel 19, and when presetting turret cycle operation circuit 41 operates according to said signal, ram 10 is withdrawn. Indexing of the sixth turret tool head is skipped at the withdrawal limit of ram 10, the first turret face is selected and the turret tool head stops. During the moving cycle of said ram 10, turret start command switch 48 of presetting panel 19 is set to ON with respect to all stations. After outside diameter cutting, the finished products are cut by cutting-off tool 62 of outside diameter tool head 8 according to command tape 29.

According to the present invention, as described above, the No. 1 tool head which is slidable in directions in parallel with and at a right angle to the axis of the spindle is controlled by the numerical control unit using a command tape. The No. 2 tool head which is slidable along the axial line of the spindle is simply controlled with respect to a single axis by the presetting type program control unit and is started according to the information of said command tape. Accordingly, simultaneous cutting of inside and outside diameters can be easily performed according to a program using the numerical control tape format for general two axis control while avoiding interference between the outside diameter cutting point of the No. 1 tool head and the inside diameter cutting point of the No. 2 tool head or interference between the two tool heads.

Moreover, according to the present invention, said No. 1 tool head is controlled in a complicated, diversified and high precision mode and the No. 2 tool head is controlled easily by the presetting means, the setting of which is freely changeable, of the presetting type program control unit, therefore said simultaneous cutting is performed under optimum cutting conditions regardless of the shape of the workpiece. Accordingly, extremely high machining efficiency is obtained in a wide range of applications regardless of diversified small lot production or mass production.

Also according to the present invention, as described above, the No. 2 tool head which moves along the axial line of the spindle is assigned to simple operations in which drilling is mainly performed, and accordingly, the program control unit can be made in a compact design and multiple cutting which has been difficult for the conventional numerically-controlled lathe due to economical reason can be achieved by a comparatively economical unit.

According to the present invention, when the cutting by the No. 1 tool head performing simultaneous cutting is finished before the cutting of the No. 2 tool head is finished during simultaneous cutting by means of said numerically-controlled No. 1 tool head and program-controlled No. 2 tool head, the No. 1 tool head movement is stopped by the tape standby command to be stored in the command tape for temporarily stopping reading of the tape. Since said tape standby release command is transmitted from the presetting board to the numerical control unit and the No. 1 tool head can be started when the cutting being performed at a certain cutting station of the No. 2 tool head is finished, execution and interruption of simultaneous cutting during the automatic cycle can be easily programmed with a proper timing and interference between the Nos. 1 and 2 tool heads or between the cutting tools thereon can be prevented.

According to the present invention, if interference occurs between the cutting tools of the Nos. 1 and 2 tool heads in simultaneous cutting due to change of the cutting time or program error, the interference can be easily avoided by changing the cutting program set in the cutting station of the No. 2 tool head assigned to the simultaneous cutting to the skip program and the setting of the cutting program to the next station. Accordingly, the cutting can be performed by simple change of a program without re-preparation of a tape which is already prepared.

Furthermore, according to the present invention, the spindle speed can be designated both by the command tape and the presetting panel and therefore the operator can select an optimum cutting speed during actual cutting in view of the machining accuracy, service life of cutting tools and machining efficiency, thus providing flexibility in programming.

According to the present invention, the forward travel limit stop command (turret standby command) for the No. 2 tool head can be set in the presetting panel and said command can be released by an indication from the command tape, and the recessing by the No. 2 tool head controlled by the presetting type program is possible in combination with the No. 1 tool head which is numerically controlled. Furthermore the No. 2 tool head can be utilized as the tailstock to perform heavy duty cutting of a bar workpiece and center machining. Accordingly, the performance of the machine can be greatly improved.

What is claimed is:

1. In a machine tool, the combination of:
    a bed;
    a headstock positioned on one end of the bed and having a spindle for rotating a workpiece;
    a slide slidable on the bed parallel with and also at a right angle to the axis of said spindle;
        at least one first tool head mounted on said slide and having a plurality of cutting tools for use in cutting the outside or inside diameters of a work-piece mounted on the spindle;
        a movable head located on said bed and spaced from said slide in the opposite direction from said headstock and movable parallel with the axis of the spindle;
        a second tool head mounted on said movable head and having at least one cutting tool thereon for use in cutting the outside diameter or inside diameter of said workpiece;
        a servo motor coupled to said slide for driving said slide;
        a drive motor coupled to said movable head for driving the movable head;
        an instruction tape which contains machining command information for the first tool head and auxiliary command information for the first tool head and the second tool head;
        a program control unit coupled to said drive motor for controlling said drive motor with machining command information and including a presetting panel which permits prior selection and presetting of the machining command information for the first tool head and auxiliary command information for the first tool head and the second tool head; and
        a numerical control unit coupled to said servo motor and said presetting panel receiving information from said instruction tape for controlling said servo motor with the machining command information and the auxiliary command information related to the first tool head and generating auxiliary command information for the second tool head and supplying it to the presetting panel, said program control unit further controlling said drive motor with the auxiliary command information for said second tool head and generating auxiliary command information for the first tool head and generating auxiliary command information for the first tool head and supplying it to the numerical control unit.

2. The combination claimed in claim 1 in which said program control unit comprises,
    a second tool head auxiliary command receiving circuit for receiving from said numerical control unit only the auxiliary command information on the instruction tape related to the second tool head;
    a start command switch on said presetting panel; and
    a second tool head cycle operation circuit coupled to the auxiliary command receiving circuit through said start command switch and to said drive motor for receiving a start signal for the second tool head from among the auxiliary commands received by said second tool head auxiliary command receiving circuit through the start command switch for operating said drive motor.

3. The combination as claimed in claim 2 in which said presetting panel further has an advance limit stop command switch thereon and said second tool head cycle operation circuit is connected to said auxiliary command receiving circuit through said advance limit stop command switch for receiving a withdrawl and an advance command signal for the second tool head from among said auxiliary commands received by said second tool head auxiliary command receiving circuit for operating said drive motor.

4. The combination as claimed in claim 2 in which said program control unit comprises:
    a second tool head auxiliary command receiving circuit for receiving from said numerical control unit tape standby command information from among the information on the instruction tape;
    a tape standby release command switch on said presetting panel;
    a tape standby release command circuit coupled to said second tool auxiliary command receiving circuit through said tape standby release command switch for receiving a signal for the tape standby release command;
    a second tool head retreat limit confirm switch connected to said tape standby release command circuit; and
    a memory circuit coupled to the second tool head auxiliary command receiving circuit and said tape standby release command circuit and to said numerical control circuit for said second tool head auxiliary command receiving circuit to stop the operation of the numerical control unit in reading the tape and a release command signal from said tape standby release command circuit to start the numerical control circuit for tape reading.

5. The combination as claimed in claim 1 in which said program control unit comprises:
    a second tool head auxiliary command receiving circuit for receiving from said numerical control unit tape standby command information from among the information on the instruction tape;
    a memory circuit coupled to said second tool head auxiliary command receiving circuit and to said numerical control unit receiving a signal from said second tool head auxiliary command receiving circuit to stop the tape reducing operation of the numerical control unit; and
    a clamp conforming switch for the movable head integral with the second tool head and supplying a signal to said memory circuit for starting the numerical control unit in the tape reading operation.

6. The combination as claimed in claim 1 further comprising:
    a spindle speed change command signal receiving circuit coupled to said numerical control unit for receiving spindle speed change command information from among the information on the instruction tape from the numerical control unit;
    a spindle speed selector switch on said preselector panel;

a preset spindle speed change signal receiving circuit coupled to said program control unit for receiving a signal from the spindle speed selector switch;

a spindle drive means; and a spindle speed command circuit coupled to said spindle speed change command circuit and said preset spindle speed change signal receiving circuit and to said spindle drive means for receiving the spindle speed change command signals from said spindle speed change command signal receiving circuit and the preset spindle speed change signal receiving circuit and supplying only the latest command information from among said commands to the spindle drive unit.

7. The combination as claimed in claim 1 further comprising a stop switch on said presetting panel, said preset spindle speed change signal receiving circuit receiving a signal from said stop switch to stop starting of the spindle speed change signal and a signal from said stop switch for generating the spindle speed change command signal.

* * * * *